(12) United States Patent
Schmidbartl et al.

(10) Patent No.: US 6,702,191 B2
(45) Date of Patent: Mar. 9, 2004

(54) AUXILLIARY MOTOR VEHICLE HEATER

(75) Inventors: Wolfgang Schmidbartl, Krailling (DE); Jörg Wandler, Olching (DE)

(73) Assignee: Webasto Thermosysteme Internatioanl GmbH, Stockdorf (DE)

( * ) Notice: Subject to any disclaimer, the term of this patent is extended or adjusted under 35 U.S.C. 154(b) by 0 days.

(21) Appl. No.: 10/234,837

(22) Filed: Sep. 5, 2002

(65) Prior Publication Data
US 2003/0075612 A1 Apr. 24, 2003

(30) Foreign Application Priority Data
Sep. 7, 2001 (DE) .......................... 101 44 158

(51) Int. Cl.⁷ .................................. B60H 1/02
(52) U.S. Cl. ................... 237/12.3 R; 237/2 A; 165/41; 165/42
(58) Field of Search ............ 237/2 A, 12.3 C, 237/12.3 R; 165/41, 42; 364/424.01, 431.1, 550

(56) References Cited
U.S. PATENT DOCUMENTS 4,274,265 A * 6/1981 Okumura ..................... 62/158
4,744,747 A * 5/1988 Kawamura et al. .......... 431/36
4,862,364 A * 8/1989 Matsuda ........................ 701/31

FOREIGN PATENT DOCUMENTS

DE 196 01 772 C2 7/1997
DE 196 11 908 A1 10/1997

* cited by examiner

Primary Examiner—Derek Boles
(74) Attorney, Agent, or Firm—Nixon Peabody LLP; David S. Safran

(57) ABSTRACT

An auxiliary motor vehicle heater (10) is provided with a control device (22) which has a connection (30) for a voltage supply line (32) which leads from the battery (34) of the motor vehicle to the control device (22). In order to especially more easily determine information for an auxiliary motor vehicle heater (10) about the operating state of the engine (36) of the motor vehicle, the control device (22) is set up to detect the voltage characteristic on the connection (30) and to determine the information "starting of the engine (36) of the motor vehicle is completed" depending on the voltage characteristic.

10 Claims, 2 Drawing Sheets

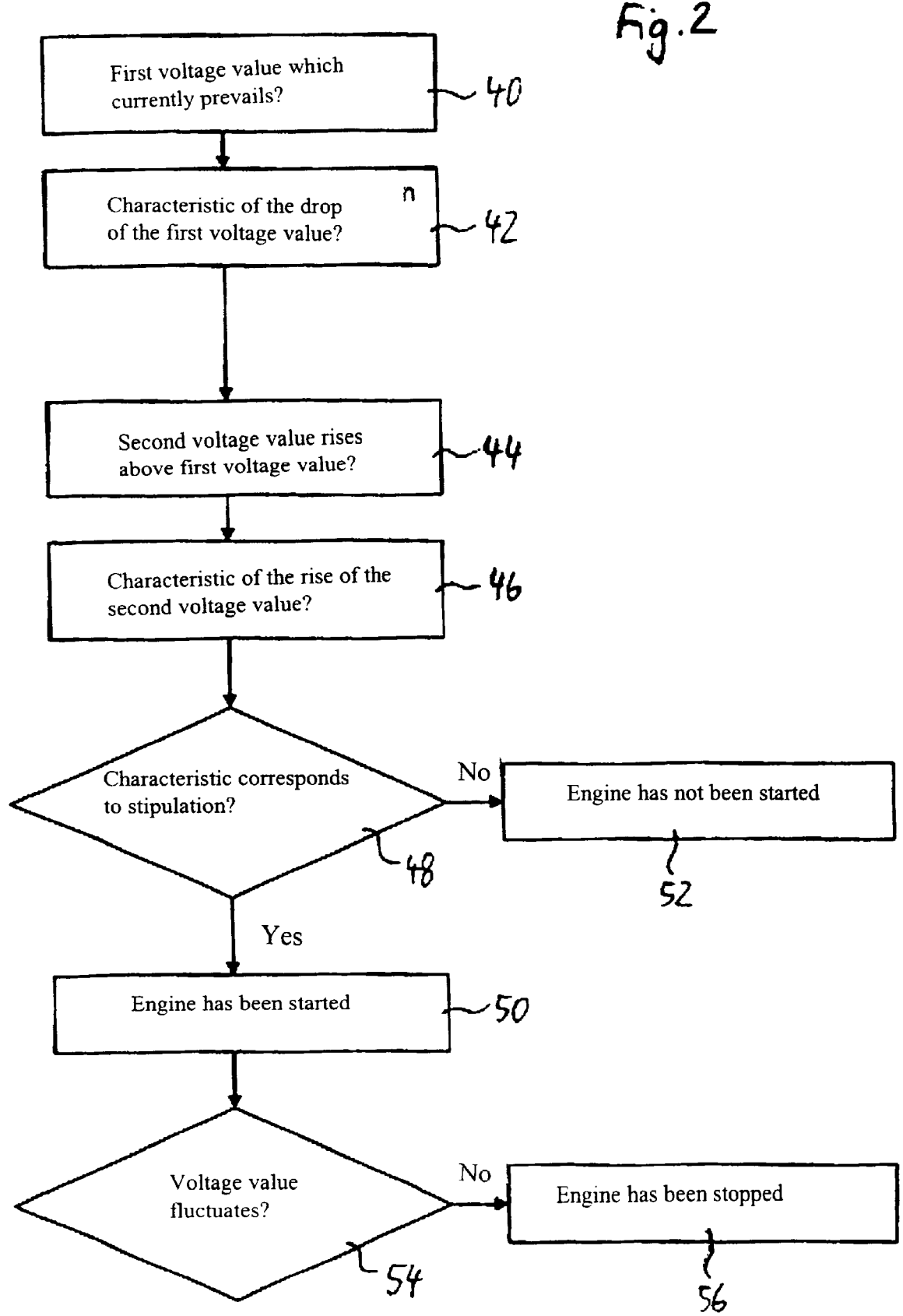

AUXILLIARY MOTOR VEHICLE HEATER

BACKGROUND OF THE INVENTION

1. Field of the Invention

The invention relates to an auxiliary motor vehicle heater with a control device which has a connection for a voltage supply line which leads from the battery of the motor vehicle to the control device. Furthermore, the invention relates to a control device for such an auxiliary motor vehicle heater, a motor vehicle with such an auxiliary motor vehicle heater, and a process for operation of an auxiliary motor vehicle heater.

2. Description of Related Art

In this connection, a motor vehicle is defined as a vehicle which is provided with an engine, especially an internal combustion engine, and which can be driven by it. The engine is generally started with a starter which is connected to the battery. The battery is charged in engine operation by a generator which is also called a dynamo. These motor vehicles generally have a passenger space for a driver, and optionally, for passengers.

Auxiliary motor vehicle heaters are used as so-called auxiliary air heaters or auxiliary water heaters in motor vehicles, such as for example in passenger cars. They are generally used to heat the passenger compartment or to preheat the cooling water of the internal combustion engine of the motor vehicle.

During operation of an auxiliary motor vehicle heater, it is often advantageous if information is available in its control device about the operating state of the engine of the motor vehicle. Therefore, in known auxiliary motor vehicle heaters, a so-called terminal 15 on the control device is connected to the ignition signal line, via which the control device receives information "engine ignition is turned on." The ignition signal line in the motor vehicle can be moved from the ignition lock in the passenger compartment to the control device of the auxiliary motor vehicle heater and there can be a connection at the terminal 15 on its control device. In control devices without a terminal 15, the required information cannot be determined so far.

German Patent DE 196 01 772 C2 discloses a process for starting an auxiliary motor vehicle heater, in which, proceeding from the initiation of the starting process by actuating the ignition lock of the motor vehicle (compare the aforementioned terminal 15), at least one temperature is checked. When a given theoretical temperature threshold is exceeded, starting of the auxiliary motor vehicle heater does not take place. Otherwise, during operation of the vehicle engine starter high-consumption assemblies, for example, the ignition means of the auxiliary motor vehicle heater, are turned off. This interruption of operation of high-consumption assemblies in motor vehicles is conventional. It is called "undervoltage switching." It is thus ensured that starting of the engine by means of the starter is not endangered. Interruption of the assemblies takes place, as explained in German Patent DE 196 01 772 C2, using a voltage signal line which indicates the current voltage value of the motor vehicle battery. If the voltage value drops below a threshold, operation of the assembly is interrupted. Therefore, it is interrupted exactly when the battery voltage drops too far due to operation of the starter. If the battery voltage should be above the threshold value, even when the starter is in operation, there is no interruption of the starting process of the auxiliary motor vehicle heater. Finally, the starting process of the auxiliary motor vehicle heater is begun again when the generator of the motor vehicle is operated by the engine. To do this, a generator signal line is connected to the control device via a terminal 61 at which there is a positive signal in this case.

SUMMARY OF THE INVENTION

The primary object of the present invention is to provide an auxiliary motor vehicle heater which can be produced more economically than known systems of the initially mentioned type. In particular, information about the operating state of the engine will be made available to the control device of the auxiliary motor vehicle heater more easily.

This object is achieved in accordance with the invention with an auxiliary motor vehicle heater of the initially mentioned type in which the control device can detect the voltage characteristic on the connection for the voltage supply line and can determine the information "starting of the engine of the motor vehicle is completed" depending on the voltage characteristic. Furthermore, the object is achieved with such a control device for an auxiliary motor vehicle heater and with a motor vehicle which is provided with such an auxiliary motor vehicle heater, and finally also with a process for operating an auxiliary motor vehicle heater with a control device with the following steps: detection of the voltage characteristic on a connection of the control device for the voltage supply line which leads from the battery of the motor vehicle to the control device, and determination of the information "starting of the engine of the motor vehicle is completed" depending on this voltage characteristic.

In the control device of the auxiliary motor vehicle heater, the invention eliminates the above described connections for the voltage signal line, the generator signal line via the terminal 61 and also the ignition signal line via the terminal 15. The required information "starting of the engine of the motor vehicle is completed," in accordance with the invention, is made available in a much simpler manner by evaluation of the voltage characteristic on a voltage supply line which is present anyway on the control device.

The evaluation of the voltage characteristic can be integrated into the electronics of modem control devices by the corresponding programming and/or with a matched circuit. The complexity necessary for this purpose is low compared to the indicated connections or terminals on the control device and its cabling in the control device and with signal lines in the motor vehicle.

In an advantageous development of the invention, the control device determines the information "starting of the engine is completed" when the voltage characteristic, proceeding from the first voltage value, has a drop and subsequent rise beyond this first voltage value. In contrast to the existing process of monitoring the battery voltage, according to the invention, it is not the fact that the voltage threshold has not been reached which is checked, but instead whether, after a drop of the voltage, it rises to a higher value than prevailed before the drop that is determined. This higher value allows the conclusion that, after the engine starter has been actuated, the engine is running and driving the generator which, for its part, charges the battery and produces the higher voltage. Thus, the voltage of the battery in a motor vehicle with a medium vehicle voltage of 12 V is roughly 12 V when the engine is off, drops dramatically when the starter is operated, and then rises during operation of the generator or dynamo to a value over 12 V, at maximum roughly to 14 V. Therefore, in this development of the invention, the voltage characteristic is examined not only with respect to the voltage drop, but also with respect to the voltage rise. The time relation and the relative change of the voltage during dropping and rising yields the required information "starting of the engine is completed." Solely evaluation of the voltage drop below a threshold value, as is described in DE 196 01 772 C2, would not be sufficient to make this information available.

In one alternatively or additionally reasonable development of the invention, the control device determines the information "starting of the engine is completed" when the voltage characteristic has fluctuations which allow conclusions about the charging of the battery using the generator of the motor vehicle. In this connection, the fluctuation of the battery voltage is also called the residual ripple of the battery voltage or the ripple voltage. This takes place, by analogy to the residual AC voltage which is superimposed on the initial DC voltage of a power supply, in spite of filtering—residual ripple or ripple voltage is also addressed there. The residual ripple which is produced by the charging of the battery generally is regularly alternating and is measured by determining the distance of the highest and lowest value of the fluctuations. The fluctuations arise as a result of the magnetic rotary field in the generator. They have a relative fluctuation width of less than 1 V to 2 V.

The control device of the invention, in addition to use in an auxiliary motor vehicle heater, can also be used in other assemblies of the motor vehicle in which the information "starting of the engine of the motor vehicle is completed" or "engine is operating" is of interest. Thus, for example, control devices can also be equipped with monitoring of the voltage characteristic in accordance with the invention on a connection for the voltage supply line, as are provided in automatic transmissions, in sliding roofs or window raiser controls, in braking systems or in safety systems, such as belt tighteners and airbags.

One embodiment of an auxiliary motor vehicle heater in accordance with the invention is explained in detail below using the accompanying drawings.

BRIEF DESCRIPTION OF THE DRAWINGS

FIG. 2 is a schematic flow chart of the determination of whether the engine of the motor vehicle has been started that is performed in accordance with the invention.

DETAILED DESCRIPTION OF THE INVENTION

Figure 1:
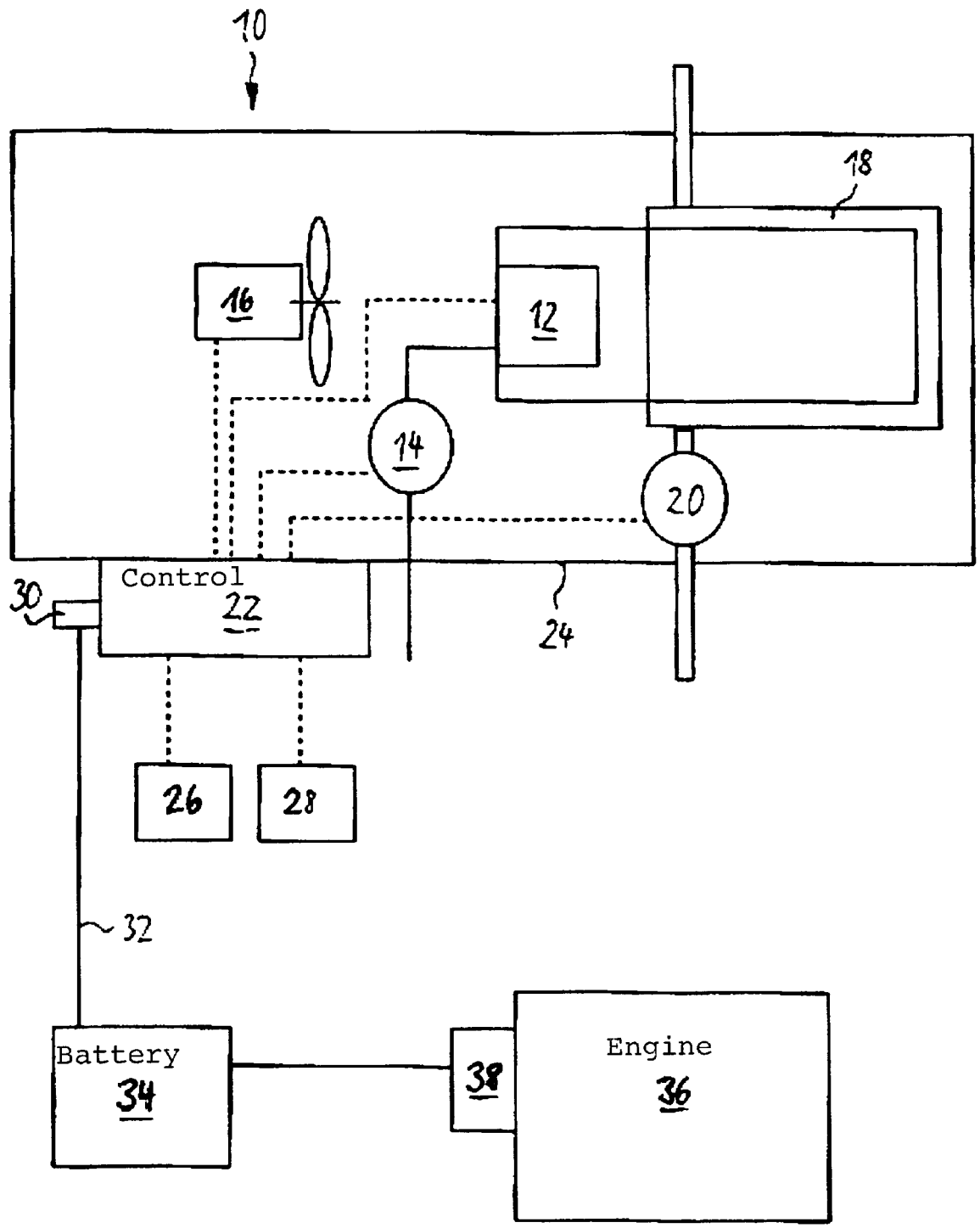
FIG. 1 is a schematic of an auxiliary motor vehicle heater with a battery and an internal combustion engine.

FIG. 1 shows an auxiliary heater 10 for installation in a motor vehicle (not shown), for example, a passenger vehicle, with an internal combustion engine. The auxiliary heater 10 has a burner 12 to which liquid fuel can be supplied using a fuel pump 14 and combustion air can be supplied using a combustion air blower 16. On the burner 12 is a heat exchanger 18 through which, in the installed state of the auxiliary heater 10, a liquid heat transfer agent is pumped by a circulation pump 20.

The heater components comprised of the burner 12, fuel pump 14, combustion air fan 16 and circulation pump 20 are coupled to a control device 22 which is located on the housing 24 of the auxiliary heater 10. Furthermore, sensors, for example, an inside temperature sensor 26 in the vehicle passenger compartment (not shown) and an outside temperature sensor 28, are connected to the control device 22.

The control device 22 is connected via a connection 30 and the voltage supply line 32 to the battery 34 for its own voltage supply. The battery 34 is charged during operation of the internal combustion engine 36 by the generator 38 of the motor vehicle.

In order to easily obtain the information "starting of the engine or internal combustion engine 36 is completed" in the control device 22, the control device 22 is set up by corresponding adaptation of its circuitry and the control programs stored in data storages to detect the characteristic of the voltage at the connection 30 of the voltage supply line 32 and to determine the required information using this characteristic.

In doing so, the control device 22, according to block 40 in FIG. 2, detects the characteristic of the voltage, first with respect to a currently prevailing first voltage value. The first voltage value is generally roughly 12 V when the internal combustion engine is off in a motor vehicle with a medium vehicle voltage of 12 V.

In the further progression, the control device 22 checks, according to the block 42 in FIG. 2, whether this first voltage value drops according by a certain amount during pre-established characteristic window, i.e., that the voltage value decreases within a certain first time interval by a predetermined first relative value. The first time interval is comparatively short and is only a few tenths of a second or milliseconds.

If the voltage has dropped rapidly, according to the block 44 in FIG. 2, it is continued to check whether the voltage value rises above the previous first voltage value within a predetermined second time interval. The second time interval is generally up to a few seconds long—as long as the time which is typically necessary for starting the internal combustion engine. The rise should take place comparatively quickly. Therefore, according to the block 46 in FIG. 2, as another criterion for the checking, there is a characteristic window for the rise with which the increase in the voltage value by a predetermined so-called third relative value is checked within a certain third time interval.

According to the block 48 in FIG. 2, when the control device determines that the characteristic of the voltage on the connection of the voltage supply line at least essentially corresponds to the given characteristic, it derives from it the information that the internal combustion engine of the motor vehicle has been started and is in operation (see the block 50 in FIG. 2). Otherwise it is recognized that the engine has not been started (see the block 52 in FIG. 2).

In the operation of the internal combustion engine, the voltage value fluctuates on the indicated connection due to the slightly alternating charging voltage or residual ripple of the generator driven by the internal combustion engine. This fluctuation is used in the auxiliary heater of the embodiment, according to the block 54 in FIG. 2, on the one hand, to protect the detected information "starting of the internal combustion engine is completed," and on the other hand, to detect possible shutoff of the internal combustion engine (see block 56 in FIG. 2).

As soon as the information "starting of the internal combustion engine is completed" has been recognized by the control device 22 (see the block 50 in FIG. 2), it checks the continuing characteristic of the voltage with respect to conventional fluctuations by filing the highest and lowest value of the voltage in a memory and checking it with regard to both its absolute and also its relative change. Therefore, the fluctuation width is determined and it is checked whether the values overall are in a certain voltage window above the original first voltage value. If this is the case, the control device 22 detects the information "internal combustion engine is in operation."

However, if the voltage value drops and/or the voltage on the connection of the voltage supply line stops fluctuating, the control device recognizes stopping of the internal combustion engine (see the block 56 in FIG. 2). Then, it is checked again as protection whether the voltage remains at least essentially free of fluctuations. Furthermore, it can be checked alternatively or additionally whether the absolute value of the voltage is within the voltage window around the first voltage value, therefore whether the voltage generated solely by the battery without the generator is on the connection again.

The information "starting of the internal combustion engine is completed" (see the block 50 of FIG. 2) and also the information "internal combustion engine has been stopped" (see the block 56 of FIG. 2) are used in the motor vehicle of the embodiment to automatically operate the heater 10 according to other parameters such as, for example, the temperature of the cooling water in the internal combustion engine 36.

Alternatively or additionally, the type of information preparation explained in the embodiment can also be used in the control device 22 to optimize, for example, the control device of a sliding roof control on the motor vehicle, which control device is not shown.

What is claimed is:

1. Auxiliary motor vehicle heater, comprising a control device with a connection for a voltage supply line leading from a battery of the motor vehicle to the control device, wherein the control device is adapted to detect a voltage characteristic of the battery on the connection and to determine information as to when starting of an engine of the motor vehicle is completed depending on the voltage characteristic of the battery.

2. Auxiliary motor vehicle heater as claimed in claim 1, wherein the control device is adapted to determine the information that starting of the engine is completed when the voltage characteristic of the battery has a drop from an initial voltage value followed by a rise above said first voltage value.

3. Auxiliary motor vehicle heater as claimed in claim 1, wherein the control device determines the information that starting of the engine is completed when the voltage of the battery characteristic has fluctuations indicating that charging of the battery using a generator of the motor vehicle is occurring.

4. Control device for an auxiliary motor vehicle heater, comprising a connection for a voltage supply line which leads from a battery of a motor vehicle to the control device, wherein the control device is adapted to detect a voltage characteristic of the battery on the connection and to determine information as to when starting of an engine of the motor vehicle is completed depending on the voltage characteristic of the battery.

5. Control device as claimed in claim 4, wherein the control device is adapted to determine the information that starting of the engine is completed when the voltage characteristic of the battery has a drop from an initial voltage value followed by a rise above said first voltage value.

6. Control device as claimed in claim 5, wherein the control device determines the information that starting of the engine is completed when the voltage characteristic of the battery has fluctuations indicating that charging of the battery using a generator of the motor vehicle is occurring.

7. Motor vehicle, comprising:
   an engine;
   a battery;
   an auxiliary motor vehicle heater;
   a control device, and
   a voltage supply line connection which leads from the battery to the control device;
   wherein the control device is adapted to detect a voltage characteristic of the battery on the connection and to determine information as to when starting of the engine of the motor vehicle is completed depending on the voltage characteristic of the battery.

8. Process for operating an auxiliary motor vehicle heater with a control device, comprising the steps of:
   detecting of a voltage characteristic of the battery on a voltage supply line connection of the control device with a battery of motor vehicle, and
   determining the information as to when starting of a engine of the motor vehicle is completed depending on the voltage characteristic of the battery detected.

9. Process as claimed in claim 8, wherein the information as to when starting of the engine is completed is determined when the voltage characteristic of the battery drops from an initial voltage value and then subsequently rises above said initial voltage value.

10. Process as claimed in claim 9, wherein the information as to when starting of the engine is completed is determined when the voltage characteristic of the battery has fluctuations indicative of charging of the battery using a generator of the motor vehicle.

* * * * *